United States Patent [19]

Chang et al.

[11] Patent Number: 5,367,918
[45] Date of Patent: Nov. 29, 1994

[54] BICYCLE FRONT FORK SHOCK ABSORBING DEVICE

[76] Inventors: Wu-Sung Chang; Huan-Yang Huang, both of No. 5-15, Lun Ya Lane, Lun Ya Lee, Yuanlin Chen, Changhwa Hsien, Taiwan, Prov. of China

[21] Appl. No.: 174,406

[22] Filed: Dec. 28, 1993

[51] Int. Cl.$^5$ .................. B62K 1/00; B62K 21/14
[52] U.S. Cl. ................... 74/551.2; 280/276; 280/279
[58] Field of Search ............... 74/551.1–551.3; 280/276, 279, 281.1, 277

[56] References Cited

U.S. PATENT DOCUMENTS

| | | | |
|---|---|---|---|
| 4,533,769 | 11/1985 | Kawaguchi | 280/276 |
| 5,094,324 | 3/1992 | Tsai | 280/276 X |
| 5,186,481 | 2/1993 | Turner | 280/276 |
| 5,193,832 | 3/1993 | Wilson et al. | 280/277 X |
| 5,195,766 | 3/1993 | Dohrmann et al. | 280/276 |
| 5,238,259 | 8/1993 | Wilson et al. | 280/279 |
| 5,275,264 | 1/1994 | Isella | 280/276 X |
| 5,284,352 | 2/1994 | Chen | 280/276 |

FOREIGN PATENT DOCUMENTS

| | | | |
|---|---|---|---|
| 4017924 | 12/1991 | Germany | 280/279 |
| 4-292286 | 10/1992 | Japan | 280/279 |
| 2112877 | 7/1983 | United Kingdom | 280/279 |
| 88/03493 | 5/1988 | WIPO | 280/279 |

*Primary Examiner*—Vinh T. Luong
*Attorney, Agent, or Firm*—Varndell Legal Group

[57] ABSTRACT

A bicycle front fork shock absorbing device includes a shock absorbing spring and a set of tubular elastomers mounted around a guide rod being linked to a headed locating screw rod in either fork blade of a bicycle front fork, the improvement including a plurality of protective caps mounted around the guide rod and separated by the tubular elastomer and the shock absorbing spring, a buffer spring received in a sleeve around the headed locating screw rod and retained between the head the headed locating screw rod and a lock screw, and wherein each protective cap has two recesses at two opposite sides respectively covered around either a tubular elastomer or the shock absorbing spring or the head of the headed locating screw rod.

1 Claim, 5 Drawing Sheets

1

BICYCLE FRONT FORK SHOCK ABSORBING DEVICE

BACKGROUND AND SUMMARY OF THE INVENTION

The present invention relates to shock absorbing devices, and relates more particularly to bicycle front fork shock absorbing device fastened the front fork of a bicycle to absorb shocks.

The fork blades of the front fork of a bicycle are commonly made in two parts that slide one inside the other. A shock absorbing device is retained within each fork blade to absorb shocks. This shock absorbing device, as shown in FIG. 1, is generally comprised of a shock absorbing spring and a set of tubular elastomers respectively mounted around a guide rod. This structure of shock absorbing device is not durable in use because the tubular elastomers will be squeezed to rub against the inside surface of the respective fork blade, causing the tubular elastomers to wear out quickly. Another drawback of this structure of shock absorbing device is that it produces noises when compressed to rub against the inside wall of the respective fork blade.

The present invention has been accomplished to provide a shock absorbing device for the front fork of a bicycle which eliminates the aforesaid drawbacks. This object is achieved by: mounting a plurality of protective caps around the guide rod permitting the protective caps to be separated by the tubular elastomer and the shock absorbing spring, and mounting a coil buffer spring received in a sleeve around the headed locating screw rod within a sleeve permitting the coil buffer spring to be retained between the head of a headed locating screw which is connected to the guide rod at the bottom, and a lock screw on the bottom end of the headed locating screw rod, wherein each protective cap has two recesses at two opposite sides respectively covered around either tubular elastomer or the shock absorbing spring or the head of the headed locating screw rod.

DETAILED DESCRIPTION OF THE PREFERRED EMBODIMENT

Figure 1:
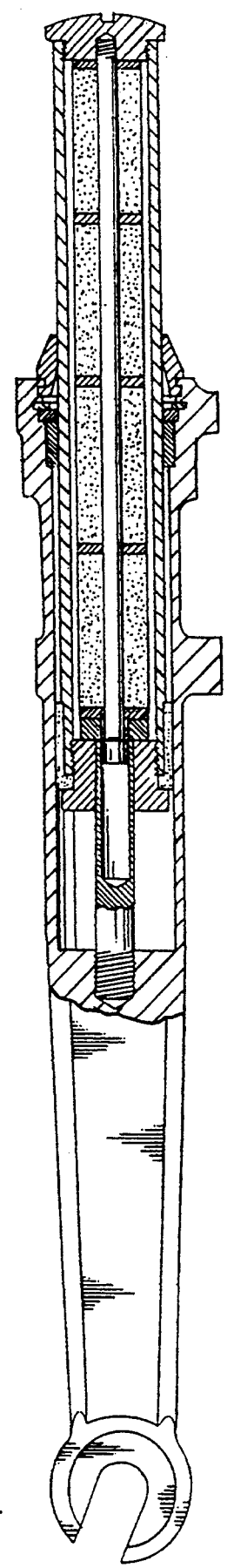
FIG. 1 is a longitudinal view in section of a bicycle front fork shock absorbing device according to the prior art.
Figure 2:
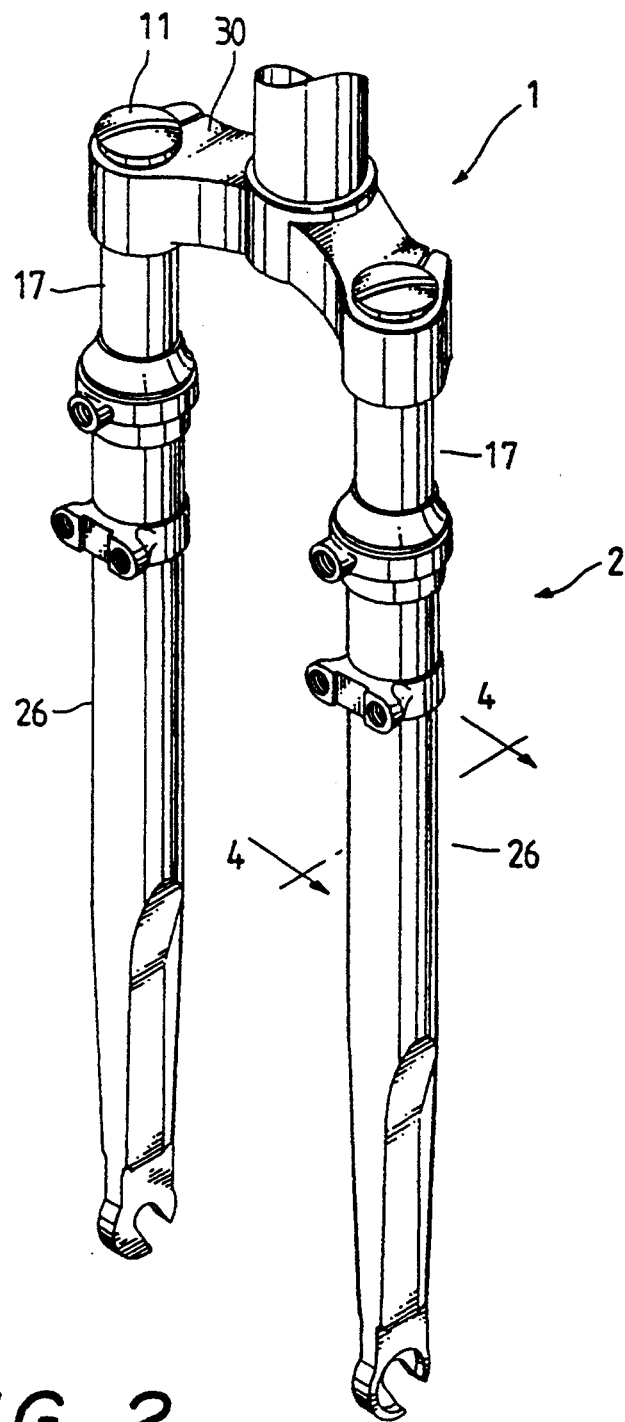
FIG. 2 is an elevational view of a bicycle front fork according to the present invention.
Figure 3:
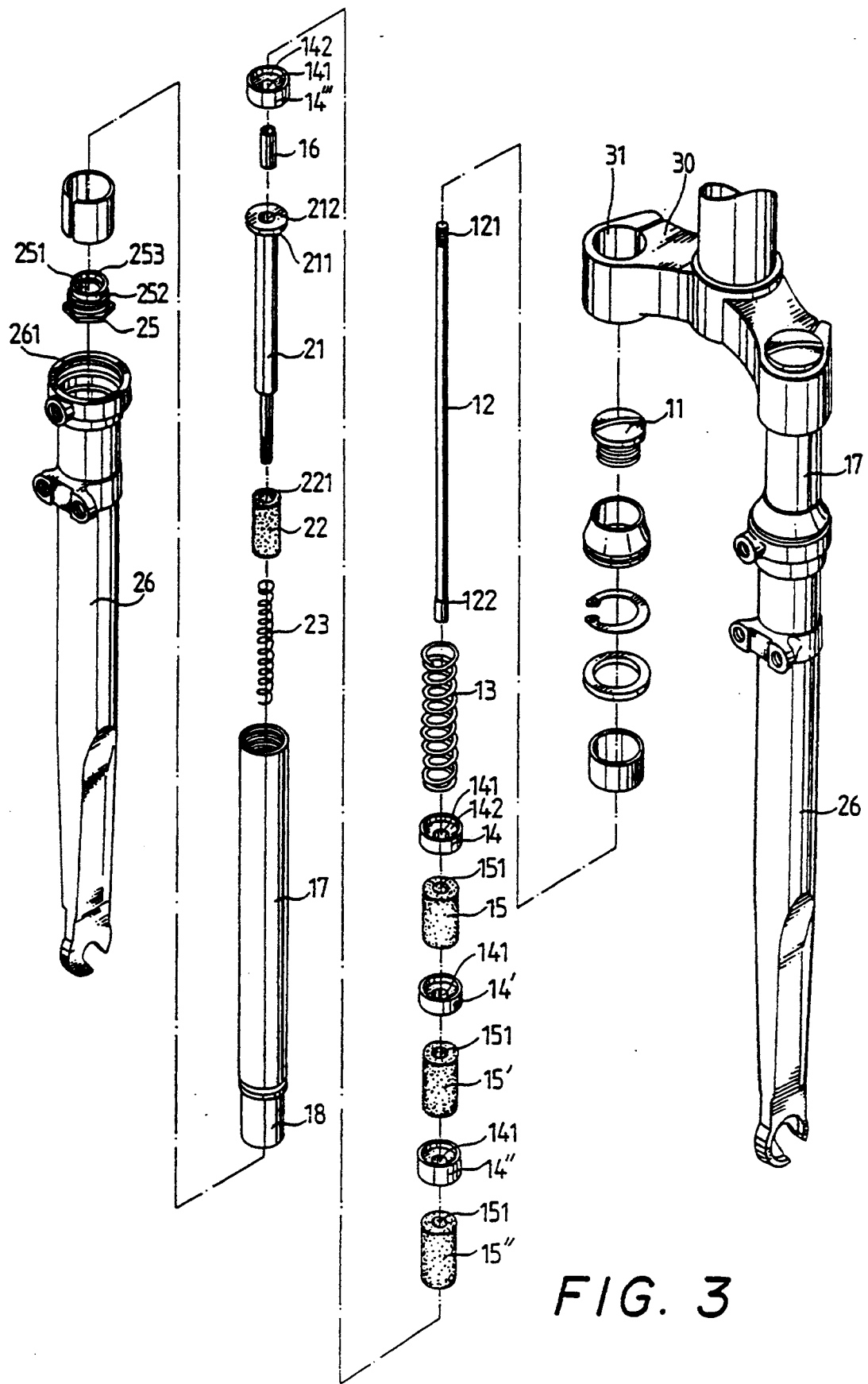
FIG. 3 is an exploded view of a bicycle front fork shock absorbing device according to the preferred embodiment of the present invention.
Figure 4:
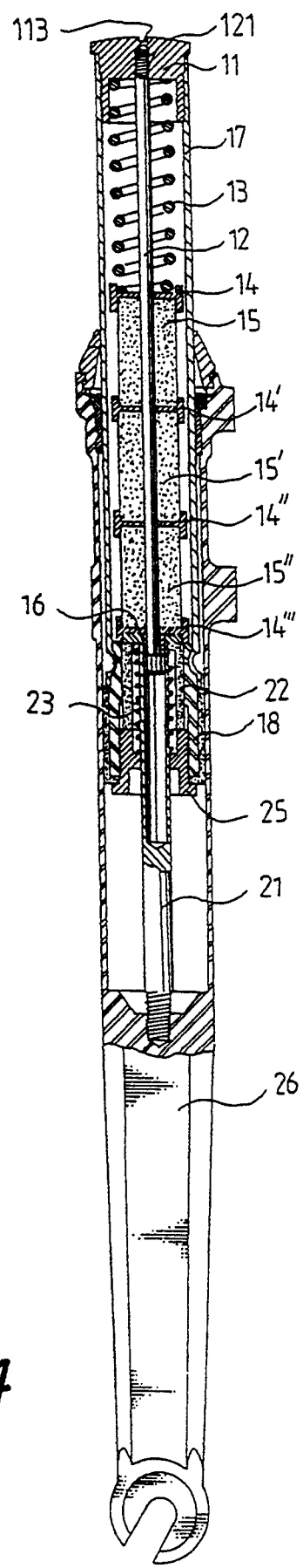
FIG. 4 is a longitudinal view in section of the bicycle front fork shock absorbing device the present invention taken along line 4—4 of FIG. 2.

Referring to FIGS. 2, 3, and 4, the front fork of a bicycle includes two fork blades, each fork blade comprised of an upper cylindrical casing 17 and a lower cylindrical casing 26. The lower cylindrical casing 26 has a closed bottom end connected to the wheel hub (not shown) of the front wheel, and an open top end 261 sleeved onto the upper cylindrical casing 17 at the bottom. The upper cylindrical casing 17 inserted into a respective blade mounting hole 31 on the blade mounting frame 30 of the front fork. A guide rod 12 is inserted through the upper cylindrical casing 17, having a threaded top end 121 fastened to the blade mounting hole 31 of the blade mounting frame 30 by a locknut 11, and a bottom end 122 inserted through a shock absorbing spring 13, the respective center through hole 151 of a set of tubular elastomers 15; 15'; 15'', and then inserted into a bushing 16 fitted into a hole 212 on the head 211 of a headed locating screw rod 21. A plurality of protective caps 14; 14'; 14''; 14''' are mounted around the guide rod 12 and separated from one another by the tubular elastomers 15; 15'; 15''. The topmost or top protective cap 14 is stopped between the shock absorbing spring 13 and the topmost tubular elastomer 15. The lowest or bottom protective cap 14''' is stopped between the head 211 of the locating screw rod 21 and the lowest tubular elastomer 15''. Each protective cap 14 comprises a center through hole 141, through which the guide rod 12 passes, and two recess 142 at two opposite sides respectively receiving tubular elastomer 15; 15'; 15'' or the shock absorbing spring 13 or the head 211 of the headed locating screw rod 21. The headed locating screw rod 21 has a bottom end inserted through the center through hole 221 of a rubber sleeve 22 and a coiled buffer spring 23 and then threaded into the center screw hole 251 of a lock screw 25. The lock screw 25 has an outer thread 252 threaded into an inner thread (not shown) on the bottom end 18 of the lower cylindrical casing 17, and an inward annular flange 253. The coiled buffer spring 23 to be received in the center through hole 221 of the rubber sleeve 22 and stopped between the head 211 of the headed locating screw rod 21 and the inward flange 253 of the lock screw 25.

Figure 5:
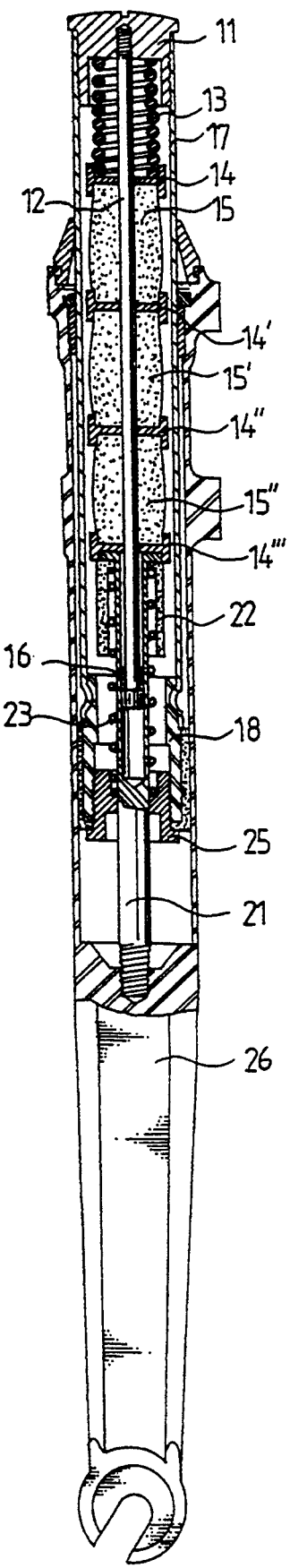
FIG. 5 is similar to FIG. 4 but showing the buffer spring compressed.

Referring to FIG. 5, as the lower cylindrical casing 26 is forced by the front wheel to move upward along the upper cylindrical casing 17, the coiled buffer spring 23, the rubber sleeve 22, the tubular elastomers 15; 15'; 15'', and the shock absorbing spring 13 are compressed to absorb or lessen shocks. As the tubular elastomers 15; 15'; 5'' are protected between the protective caps 14; 4'; 14''; 14''', compression pressure is uniformly distributed through the tubular elastomers 15; 15'; 15'' in the longitudinal direction, and therefore the tubular elastomers 15; 15'; 15'' will not wear out quickly, and no noises will be produced when the tubular elastomers 15; 15'; 15'' are compressed.

We claim:

1. A bicycle front fork shock absorbing device fastened within upper and lower cylindrical casings of either fork blade of a bicycle front fork comprising a guide rod having a top end fastened to a fork blade mounting frame of said bicycle front fork by a locknut and a bottom end, a headed locating screw rod having a head connected to said bottom end of said guide rod and a bottom end connected to a bottom end of said upper cylindrical casing of a respective said fork blade by a lock screw, a shock absorbing spring mounted around said guide rod and arranged below said locknut, a plurality of tubular elastomers mounted around said guide rod and vertically retained between said shock absorbing spring and said head of said headed locating screw rod, a plurality of protective caps mounted around said guide rod and separated by said tubular elastomers, a rubber sleeve mounted around said headed locating screw rod, and a coiled buffer spring mounted around said headed locating screw rod within said rubber sleeve and between said head of said headed locating screw rod and said lock screw, said protective caps including a top protective cap arranged between said shock absorbing spring and said tubular elastomers and a bottom protective cap arranged between said tubular elastomers and said head of said headed locating screw rod, each said protective cap comprising two opposing recesses, one recess of said top protective cap receiving said shock absorbing spring, and one recess of said bottom protective cap receiving said head of said headed locating screw rod.

* * * * *